United States Patent [19]

Manktelow

[11] 4,430,592
[45] Feb. 7, 1984

[54] ELECTROMAGNETIC BRAKE

[75] Inventor: Peter Manktelow, McHenry Shores, Ill.

[73] Assignee: Tape Research, Inc., Cary, Ill.

[21] Appl. No.: 297,763

[22] Filed: Aug. 31, 1981

[51] Int. Cl.³ ............................................. F16D 27/04
[52] U.S. Cl. ..................................... 310/93; 188/161; 310/77
[58] Field of Search ................... 310/75 D, 76, 77, 78, 310/92, 93, 100; 188/31, 60, 69, 161, 163; 192/70.19, 107 R; 318/9, 14

[56] References Cited

U.S. PATENT DOCUMENTS 2,742,599  4/1956  Schweighofer ....................... 310/76
3,173,623  3/1965  Schoebel .............................. 188/163
3,190,156  6/1965  Schuman ................................ 310/92
3,400,797  9/1968  Horn et al. ........................... 188/161
3,734,256  5/1973  Compton et al. .................... 188/161

Primary Examiner—J. D. Miller
Assistant Examiner—D. L. Rebsch
Attorney, Agent, or Firm—Edmond T. Patnaude

[57] ABSTRACT

A brake assembly includes a non-magnetic brake housing fixedly mounted to a motor shaft and a magnetic brake disc axially movable along the shaft in mechanically interlocked relationship with the brake housing between a braking position where it is attracted by an electromagnet against a fixed friction surface and a non-braking position into which it is biased by a pair of compression springs.

2 Claims, 3 Drawing Figures

ELECTROMAGNETIC BRAKE

The present invention relates in general to devices for braking the rotors of electric motors, and it relates in particular to a new and improved electromagnetic friction brake which is inexpensive to manufacture, durable in construction, and easily and quickly mounted to an electric motor.

BACKGROUND OF THE INVENTION

There are many times when it is necessary to quickly stop the rotation of the rotor of a high speed electric motor, and various types of braking techniques including, inter alia, dynamic braking and friction braking are well known in the art. One example of a braking application is a magnetic tape drive. Such a drive requires rapid, controlled stopping of the drive motor, and electromagnetic friction brakes have been used with such drives. However, while the prior art brakes have been made with sufficient precision to provide the necessary smooth braking action, they have been relatively expensive to manufacture and they have had a relatively short life.

It will be appreciated by those acquainted with the data processing field, that the down-time of a computer tape drive system is extremely costly. Therefore, it would be desirable to provide a braking system which is suitable for use with a tape-drive electric motor and which has a long, maintenance-free life.

SUMMARY OF THE INVENTION

Briefly, there is provided in accordance with the present invention a new and improved electromagnetic friction brake comprising an electromagnet mounted in proximity to the shaft of an electric motor and having a friction braking surface mounted in fixed relationship with the stator of the motor. A magnetic brake disc is mounted on the motor shaft for rotation therewith and has a friction braking surface facing the braking surface of the electromagnet. A non-magnetic support member is fixedly mounted to the shaft and carries the brake disc, the latter being mounted to the support member in a manner permitting relative axial movement between the two parts but preventing relative rotational movement. A plurality of compression springs resiliently bias the brake disc out of engagement with the braking surface of the electromagnet but permit axial movement of the disc into engagement with the electromagnet when the magnet is energized. However, no torque is transmitted between the disc and the support member by the compression springs. Rather, the entire braking torque is transmitted between the support member and the disc by mutually interlocking abutment surfaces on the two parts.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
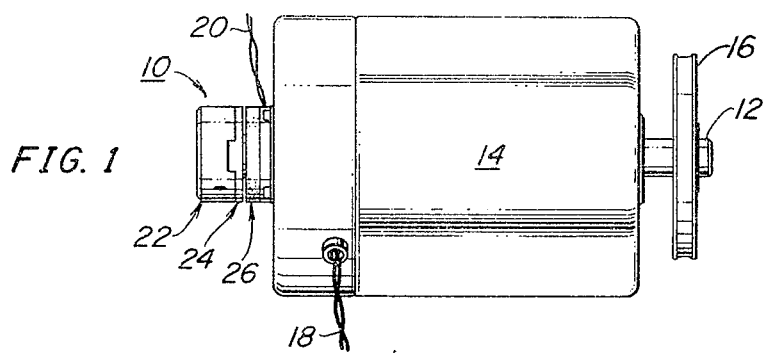
FIG. 1 is an elevational view showing a brake embodying the present invention in use with a magnetic tape-drive electric motor.

Referring particularly to FIG. 1, an electromagnetic friction brake assembly embodying the present invention is identified by the reference character 10 and is mounted to the shaft 12 of an electric motor 14. The motor 14 is conventional and includes a non-rotatable stator suitably affixed to the motor housing and a rotor including or affixed to the shaft 12. In the illustrated embodiment of the invention the shaft 12 extends from both ends of the motor, the brake 10 being mounted at one end of the shaft 12 and a tape drive capstan or the like 16 being mounted at the other end. A pair of twisted leads 18 supply electric power to the motor, and a pair of twisted leads 20 couple electric current to the brake assembly 10 during a braking operation.

Figure 2:
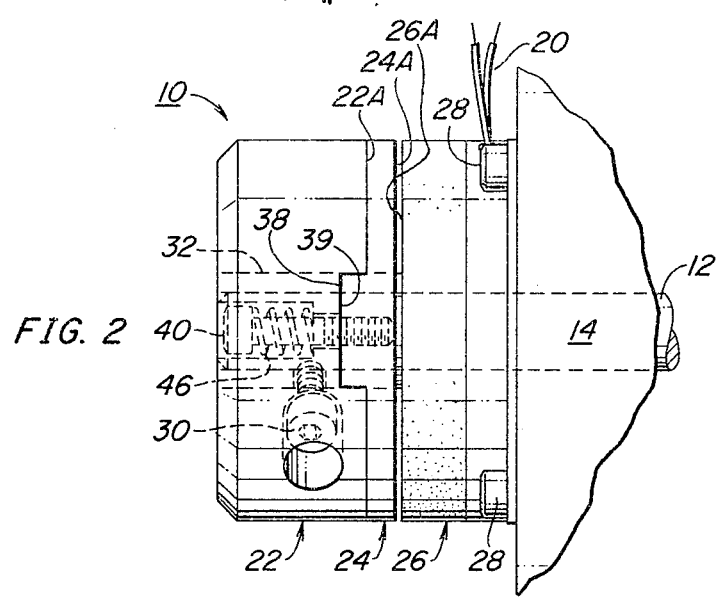
FIG. 2 is an enlarged, elevational view showing the brake of the present invention mounted to an electric motor.
Figure 3:
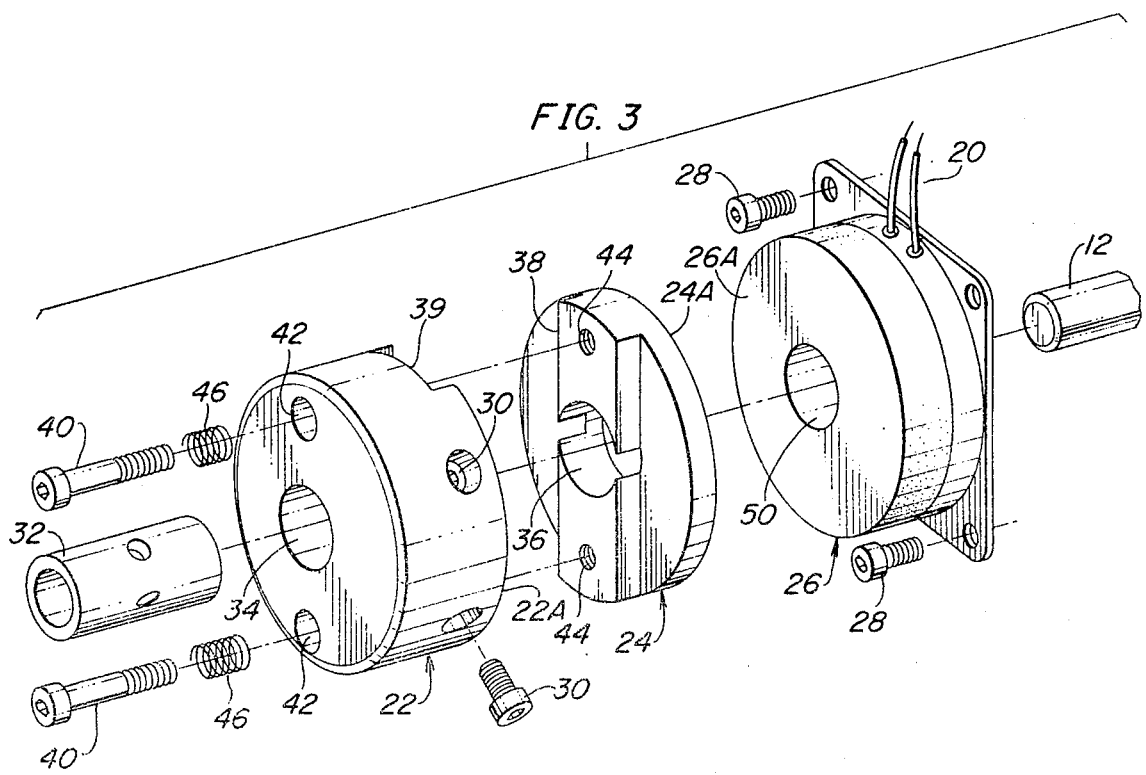
FIG. 3 is an exploded perspective view of the principal elements of the brake shown in FIGS. 1 and 2.

Referring to FIGS. 2 and 3, the brake assembly 10 may be seen to comprise as its principal elements a non-magnetic support or brake housing 22 fixedly mounted to the shaft 12, a magnetic brake disc 24 non-rotatably mounted to the support 22 for limited movement in a direction parallel to the axis of the shaft 12, and an electromagnet 26 fixedly mounted to the housing of the motor 14. For most applications, it is preferable to mount the electromagnet 26 to the housing of the motor 14 by means of a plurality of screws 28, but where more convenient to do so the magnet 26 may be mounted in any other suitable manner which holds it in a fixed position relative to the stator of the motor.

The support 22, which may be a block of aluminum or other sufficiently strong non-magnetic material, has a central bore into which the shaft 12 extends, and a plurality of set screws 30 are located in complimentary radial holes in the support 22 to lock it to the shaft 12. A non-magnetic bushing 32 is suitably formed of brass and is press fitted into the central longitudinal bore 34 of the support 22. The bushing 32 extends from the end 22A of the support 22 and extends into a central bore 36 in the brake disc member 24. A slip fit is provided between the bushing 32 and the disc 24. The disc 24 is thus free to slide in an axial direction along the motor shaft while the planar face 24A remains perpendicular to the shaft 12 at all times.

In order to prevent relative rotation between the parts 22 and 24, the support 22 is provided with a diametrically extending groove 39 in the face 22A thereof and the disc 24 is provided with a complimentary shaped, diametrically extending rib 38. The rib 38 fits into the groove 39, sufficient clearance being provided to provide a slip fit between the parts.

The disc 24 is attached to the support 22 by means of a plurality of screws 40 which extend through corresponding holes 42 and are threadedly received in aligned, blind holes 44 in the disc 24. As shown, the holes 42 and 44 are respectively provided in the groove 39 and in the rib 38. The holes 42 are countersunk to provide annular shoulders which are abutted by a pair of coil springs 46 compressed between the annular shoulders and the heads of the screws 40. It will thus be seen that movement of the disc 24 and the support 22 is limited by the bottoming out of the springs 46. The axial dimension of the groove 39 and the rib 38 is such that the disc 24 cannnot be moved out of interlocked relationship with the support 22.

The electromagnet 26 has a central bore 50 which rotatably receives the shaft 12. A planar, friction face 26A on the electromagnet lies perpendicular to the shaft 12 and parallel to the face 24A of the disc 24. Where the magnet is mounted to the housing of the motor, as in FIGS. 1 and 2, the support 22 is positioned on the shaft 12 with a spacing of say, a few thousandths of an inch between the faces 24A and 26A. When the magnet 26 is deenergized, the rib 38 is bottomed in the groove 37. Then, when the electromagnet is energized the magnetic disc 24 is magnetically attracted by the magnetic field of the magnet to the braking position wherein the face 24A abuts the face 26A. One or both of the faces 24A and 26A may have a roughened friction surface. However, the disc 24 may be a cast of lead steel wherefor the surface 24A will be sufficiently rough to effect good braking when pulled against the face 26A of a steel field piece of the magnet 26. During normal operation of the motor with the electromagnet deenergized, the springs 42 expand to pull the disc 24 into the non-braking position out of engagement with the electromagnet 26, whereby the shaft 12 may rotate freely relative to the electromagnet.

It may thus be seen that the mutually abutting surfaces on the groove 39 and the rib 38 provide the sole torque coupling parts between the parts 22 and 24. The bushing 32 and the bore 50 assure that the braking surfaces 24A and 26A are mutually parallel to prevent intermittent braking and uneven surface wear. Although the interlocking surfaces are provided by the groove 39 and the rib 38 in the illustrated embodiment, other configurations may be used to mechanically lock the parts 22 and 24 against relative rotation while permitting axial movement of the disc 24 between the braking and nonbraking positions.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An electromagnetic brake for use with an electric motor having a stator and a rotatable drive shaft, said brake comprising in combination an electromagnet mounted in fixed relationship with said stator
   and having an opening through which said shaft rotatably extends;
   a non-magnetic support member affixed to said shaft in spaced relationship with said electromagnet for rotation with said shaft;
   said support member including:
     a generally cylindrical block member having a central bore receiving a tubular bushing into which said shaft extends and which extends into a central bore in said disc member, radially extending screw means extending through said block member into engagement with said shaft for fixing said block member to said shaft, a plurality of countersunk holes extending through said block member in parallel relationship with said shaft, a plurality of headed screws slidably extending through said holes into threaded engagement with said brake disc member, and said coil springs respectively surrounding the shanks of said screws and being compressed between the heads of said screws and said block member to bias said screws in an axial direction away from said electromagnet;
   a brake disc member formed of a ferromagnetic material and mounted to said support member for axial movement between a braking position in engagement with said electromagnet when said electromagnet is energized and a non-braking position away from said electromagnet when said electromagnet is deenergized;
   mutually interlocking means on said support member and on said disc member for preventing relative rotation between said disc member and said support member;
   said interlocking means including a diametrically extending groove in one of said members, and a diametrically extending rib on the other of said members; and
   spring means carried by said support member for resiliently biasing said disc member toward said non-braking position.

2. The combination according to claim 1 wherein said disc member and said electromagnet have generally planar, mutually facing friction braking surfaces.

* * * * *